(12) United States Patent
Hoevenaar

(10) Patent No.: US 11,605,157 B2
(45) Date of Patent: *Mar. 14, 2023

(54) ADAPTIVE IMAGE PROCESSING

(71) Applicant: Snap-on Incorporated, Kenosha, WI (US)

(72) Inventor: Robert J. Hoevenaar, De Weere (NL)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,116

(22) Filed: Sep. 13, 2021

(65) Prior Publication Data

US 2021/0406585 A1  Dec. 30, 2021

Related U.S. Application Data

(63) Continuation of application No. 16/525,996, filed on Jul. 30, 2019, now Pat. No. 11,144,780.

(51) Int. Cl.
*G06K 9/00* (2022.01)
*G06T 5/50* (2006.01)
*G06T 7/80* (2017.01)
*H04N 25/59* (2023.01)
*H04N 25/67* (2023.01)

(52) U.S. Cl.
CPC .................. *G06T 5/50* (2013.01); *G06T 7/80* (2017.01); *H04N 25/59* (2023.01); *H04N 25/67* (2023.01); *G06F 2218/02* (2023.01); *G06F 2218/08* (2023.01)

(58) Field of Classification Search
CPC ...................................................... G06T 5/50
See application file for complete search history.

(56) References Cited

U.S. PATENT DOCUMENTS

| 9,117,134 | B1 | 8/2015 | Geiss et al. |
| 9,195,899 | B2 | 11/2015 | Topfer et al. |
| 11,144,780 | B2* | 10/2021 | Hoevenaar ............. G06T 5/003 |
| 2004/0081363 | A1* | 4/2004 | Gindele .................. G06T 5/007 |
| | | | 382/260 |
| 2005/0073596 | A1 | 4/2005 | Takahashi |
| 2011/0052095 | A1 | 3/2011 | Deever |

(Continued)

FOREIGN PATENT DOCUMENTS

CN  106897653 A  6/2017

OTHER PUBLICATIONS

International Search Report and Written Opinion dated Oct. 9, 2020 in connection with PCT/US2020/044076 filed on Jul. 29, 2020, 13 pages.

*Primary Examiner* — Hadi Akhavannik
(74) *Attorney, Agent, or Firm* — McDonnell Boehnen Hulbert & Berghoff LLP

(57) ABSTRACT

An imaging device includes one or more processors; and a computer readable medium storing instructions that, when executed by the one or more processors, cause the imaging device to perform functions including: capturing a first image and thereafter a second image; making a determination of whether or not a difference between the first image and the second image is greater than a threshold value; generating a third image by processing the second image using an image processing algorithm that corresponds to the determination; and displaying the third image.

20 Claims, 11 Drawing Sheets

(56) References Cited

U.S. PATENT DOCUMENTS

| | | | |
|---|---|---|---|
| 2013/0314568 A1* | 11/2013 | Vranceanu | H04N 5/2355 348/239 |
| 2014/0002342 A1* | 1/2014 | Fedorovskaya | G06Q 10/10 345/156 |
| 2016/0253947 A1* | 9/2016 | Arai | G09G 3/3659 345/690 |
| 2016/0314751 A1* | 10/2016 | Arai | G09G 3/3426 |
| 2016/0360098 A1* | 12/2016 | King | G06V 10/10 |
| 2018/0084181 A1 | 3/2018 | Sachs et al. | |
| 2021/0406585 A1* | 12/2021 | Hoevenaar | G06T 5/003 |

* cited by examiner

218

| j 217 | k 219 | l 221 |
| --- | --- | --- |
| m 223 | n 225 | o 227 |
| p 229 | q 231 | r 233 |

FIG. 8

ADAPTIVE IMAGE PROCESSING

CROSS-REFERENCE TO RELATED APPLICATIONS

This application claims priority to and is a continuation of U.S. patent application Ser. No. 16/525,996, filed on Jul. 30, 2019, the contents of which are incorporated herein by reference in their entirety.

BACKGROUND

Thermal imaging devices can be used to capture still thermal images or thermal video streams of various objects. Some thermal imaging sensors, such as thermopile arrays, can exhibit an undesirable level of thermal noise. For example, a given pixel of a thermopile array that is used to capture a thermal video stream can exhibit a large amount of thermal variability between time-adjacent frames of the video stream. This variability will generally be present even when capturing a video stream of a stationary object using a stationary thermal imaging device (e.g., a device resting on a tripod). Temporal image filtering can be used to reduce the variability caused by thermal noise, but the time constant required for an effective filter can be greater than the desired frame capture rate. The addition of spatial image filtering will also increase the filtering time constant. Thus, the design of thermal imaging devices generally involves the balancing of reduced thermal noise and increased frame rate in the context of thermal video stream capture.

SUMMARY

One aspect of the disclosure is an imaging device comprising: one or more processors; and a computer readable medium storing instructions that, when executed by the one or more processors, cause the imaging device to perform functions comprising: capturing a first image and thereafter a second image; making a determination of whether or not a difference between the first image and the second image is greater than a threshold value; generating a third image by processing the second image using an image processing algorithm that corresponds to the determination; and displaying the third image.

Another aspect of the disclosure is a method comprising: capturing a first image and thereafter a second image; making a determination of whether or not a difference between the first image and the second image is greater than a threshold value; generating a third image by processing the second image using an image processing algorithm that corresponds to the determination; and displaying the third image.

Another aspect of the disclosure is a non-transitory computer readable medium storing instructions that, when executed by an imaging device, cause the imaging device to perform functions comprising: capturing a first image and thereafter a second image; making a determination of whether or not a difference between the first image and the second image is greater than a threshold value; generating a third image by processing the second image using an image processing algorithm that corresponds to the determination; and displaying the third image.

By the term "about" or "substantially" with reference to amounts or measurement values described herein, it is meant that the recited characteristic, parameter, or value need not be achieved exactly, but that deviations or variations including, for example, tolerances, measurement error, measurement accuracy limitations, and other factors known to those of skill in the art, may occur in amounts that do not preclude the effect the characteristic was intended to provide.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 8 is a schematic diagram of operations performed by an imaging device, according to an example embodiment.

DETAILED DESCRIPTION

Figure 1:
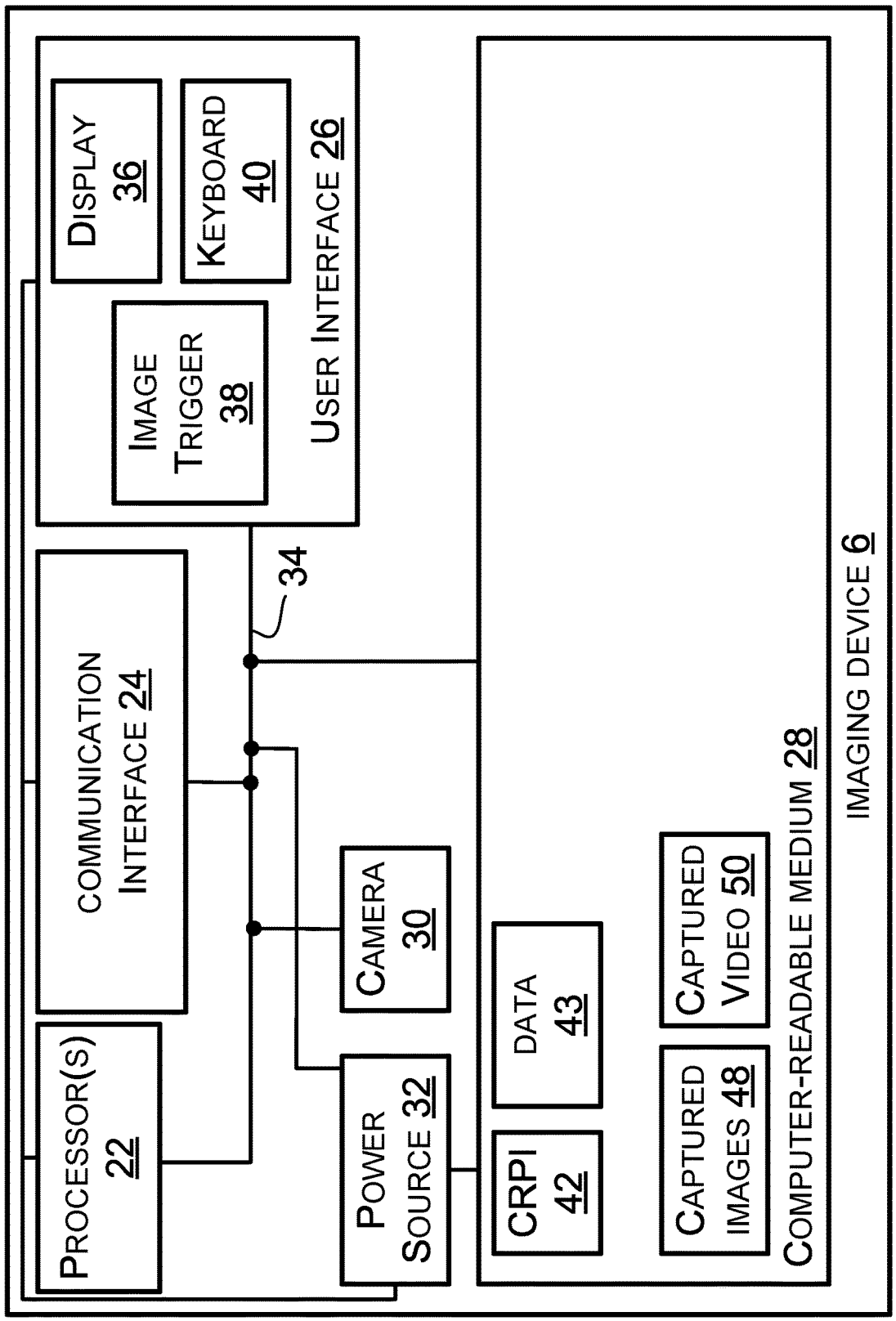
FIG. 1 is a schematic block diagram of an imaging device, according to an example embodiment.

In the context of thermal video stream capture, the design of thermal imaging devices can involve the balancing of reduced thermal noise and increased frame rate. For example, increasing the complexity of image processing that is used to reduce thermal noise can increase the processing time required per frame of captured video. This, in turn, can decrease a maximum frame rate of image capture. That is, a particular video frame generally cannot be displayed until a preceding video frame has been captured, processed, and displayed. Accordingly, it can be beneficial to use adaptive image processing on a frame by frame basis in a way that enhances the impact such processing will have on the video stream.

Within examples, an imaging device captures a first image and thereafter a second image and makes a determination of whether or not a difference between the first image and the second image is greater than a threshold value. The threshold value can represent a level of difference (e.g., a difference in infrared intensity or temperature) between the first image and the second image at which it can be inferred that objects within the field of view of the camera have moved and/or that the camera itself has moved during the time between capture of the first image and capture of the second image. Thus, by determining whether or not the first image and the second image represent the same point of view and the same scene, the imaging device can select an appropriate image processing algorithm that can yield reductions in thermal noise when performed on the second image (and possibly the first image).

For example, temporal processing can include any image processing algorithm that includes comparing two or more images that were captured at different times and processing the images according to those comparisons. Temporal processing can yield a reduction in thermal noise when applied to two time-adjacent frames that depict the same scene from the same point of view. In contrast, temporal processing will typically not be helpful for processing a pair of images that depict substantially different scenes or substantially different points of view. Thus, the imaging device can avoid performing temporal processing (e.g., in favor of spatial processing) if the difference between the first image and the second image is greater than the threshold value.

Spatial processing can include any image processing algorithm that includes comparing two or more pixels of a single image and processing the image according to those comparisons. Spatial processing can yield a reduction in thermal noise when applied to a single image.

After adaptive image processing is performed, the imaging device can generate a third image by processing the second image using the image processing algorithm that corresponds to the determination (e.g., the determination of whether or not motion occurred between capture of the first image and capture of the second image). Finally, the imaging device can display the third image.

An imaging device 6 is depicted in FIG. 1. As shown in FIG. 1, the imaging device 6 includes a processor 22, a communication interface 24, a user interface 26, a computer-readable medium 28, a camera 30, a power source 32, and a data bus 34. A processor such as the processor(s) 22 or any other processor discussed in this description can include one or more processors. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI). For example, the processor 22 can execute CRPI 42 stored in the computer-readable medium (CRM) 28. A processor can be configured to execute hard-coded functionality in addition to or as an alternative to software-coded functionality (e.g., via CRPI). The one or more processors of the processor 22 can be programmed to perform any function or combination of functions described herein as being performed by the imaging device 6. The CRM 28 can also store data 43, which can include any data described herein.

A computer-readable medium such as the CRM 28 or any other CRM discussed in this description can include one or more CRM. A CRM can include a non-transitory CRM, a transitory CRM, or both a non-transitory CRM and a transitory CRM. A non-transitory CRM, or a portion thereof, can be located within or as part of a processor (e.g., within a single integrated circuit chip). A non-transitory CRM, or a portion thereof, can be separate and distinct from a processor.

A non-transitory CRM can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), flash memory, a hard disk drive, a Compact Disc (CD), a Digital Video Disk (DVD), a CD read-only memory (CD-ROM), or other optical storage, magnetic cassettes, magnetic tape, magnetic disk storage or other magnetic storage devices, or any other medium which can be used to store the desired information and which can be accessed by a processor and/or a memory controller. The RAM can include static RAM or dynamic RAM.

The CRM 28 can include CRPI 42, captured images 48, and captured video 50. The captured images 48 can include image data corresponding to thermal images captured by the imaging device 6. The captured video 50 can include image data corresponding to thermal images captured as a video stream by the imaging device 6.

The communication interface 24 can comprise a transceiver and a receiver. A transceiver can comprise one or more transceivers. Each transceiver can include one or more transmitters configured to transmit data onto a network. Each transceiver can include one or more receivers configured to receive data carried over a network. The data transmitted or received by a transceiver can comprise any data (e.g., repair tips, images, video, image tips, or text tips) discussed in this description or any combination thereof.

A transmitter can transmit radio signals carrying data and a receiver can receive radio signals carrying data. A transceiver with that transmitter and receiver can include one or more antennas and can be referred to as a "radio transceiver," an "RF transceiver," or a "wireless transceiver." The radio signals transmitted or received by a radio transceiver can be arranged in accordance with one or more wireless communication standards or protocols such as an Institute of Electrical and Electronics Engineers (IEEE) standard, such as (i) an IEEE 802.11 standard for wireless local area networks (wireless LAN) (which is sometimes referred to as a WI-FI® standard) (e.g., 802.11a, 802.11b, 802.11g, 802.11n, 802.11ac, 802.11ad, 802.11af, 802.11ag, 802.11ah, 802.11ai, 802.11aj, 802.11aq, 802.11ax, or 802.11ay), (ii) an IEEE 802.15 standard (e.g., 802.15.1, 802.15.3, 802.15.4 (ZigBee), or 802.15.5) for wireless personal area networks (PANs), (iii) a BLUETOOTH® version 4.1 or 4.2 standard developed by the Bluetooth Special Interest Group (SIG) of Kirkland, Wash., (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a universal serial bus (USB) specification, or some other wired communication standard.

The data transmitted by a transceiver can include a destination identifier or address of a system component to which the data is to be transmitted. The data transmitted by a transceiver can include a source identifier or address of the system component including the transceiver. The source identifier or address can be used to send a response to the system component that includes the transceiver that sent the data.

The communication interface 24 can include a modem, a network interface card, and/or a chip mountable on a circuit board. As an example the chip can comprise a CC3100 WI-FI® network processor available from Texas Instruments, Dallas, Tex., a CC256MODx BLUETOOTH® Host Controller Interface (HCI) module available from Texas instruments, and/or a different chip for communicating via WI-FI®, BLUETOOTH® or another communication protocol.

The camera 30 can take the form of a thermal imaging camera (e.g., an infrared camera). The camera 30 can include one or more thermal image sensors (e.g., a bolometer or a thermopile infrared array sensor) and/or one or more other infrared wave guiding elements that are known in the art.

The camera 30 can alternatively or additionally take the form of a visible light camera. The camera 30 can include one or more image sensors such as a charge-coupled device (CCD) image sensor or a complementary metal oxide semiconductor (CMOS) image sensor, one or more lenses, and/or one or more other optical elements that are known in the art.

The power source 32 can be configured in any of a variety of configurations or combinations of the variety of configurations. As an example, the power source 32 can include circuitry to receive AC current from an AC electrical supply (e.g., electrical circuits connected to an electrical wall outlet) and convert the AC current to a DC current for supplying to one or more of the components within the imaging device 6. As another example, the power source 32 can include an energy storage device, such as a battery, or be battery operated. As yet another example, the power source 32 can include a solar cell or be solar operated. The power source 32 can include electrical circuits operatively connected to the power source 32 in order to distribute electrical current for powering components of the imaging device 6.

The user interface 26 can include a display 36, an image trigger 38, and/or a keyboard 40. The display 36 can include a capacitive touch screen display, a resistive touch screen display, a plasma display, an LED display, a cathode ray tube display, an OLED display, and/or an LCD. The display 36 can include a touch screen display with the LCD. For instance, the display 36 can include a capacitive (such as a projective capacitive) touch screen display or a resistive touch screen display. Other examples of the display 36 are possible.

The image trigger 38 can, but need not necessarily, include a trigger button. The processor 22 can determine different operating modes for the imaging device 6 based on a current operating mode of the imaging device 6 and use of the image trigger 38.

The keyboard 40 can include a hardware keyboard with a set of numeric keys, alpha-numeric keys, and/or alphabet keys. Alternatively, the keyboard 40 could be a virtual keyboard displayed on a touchscreen.

Figure 2:
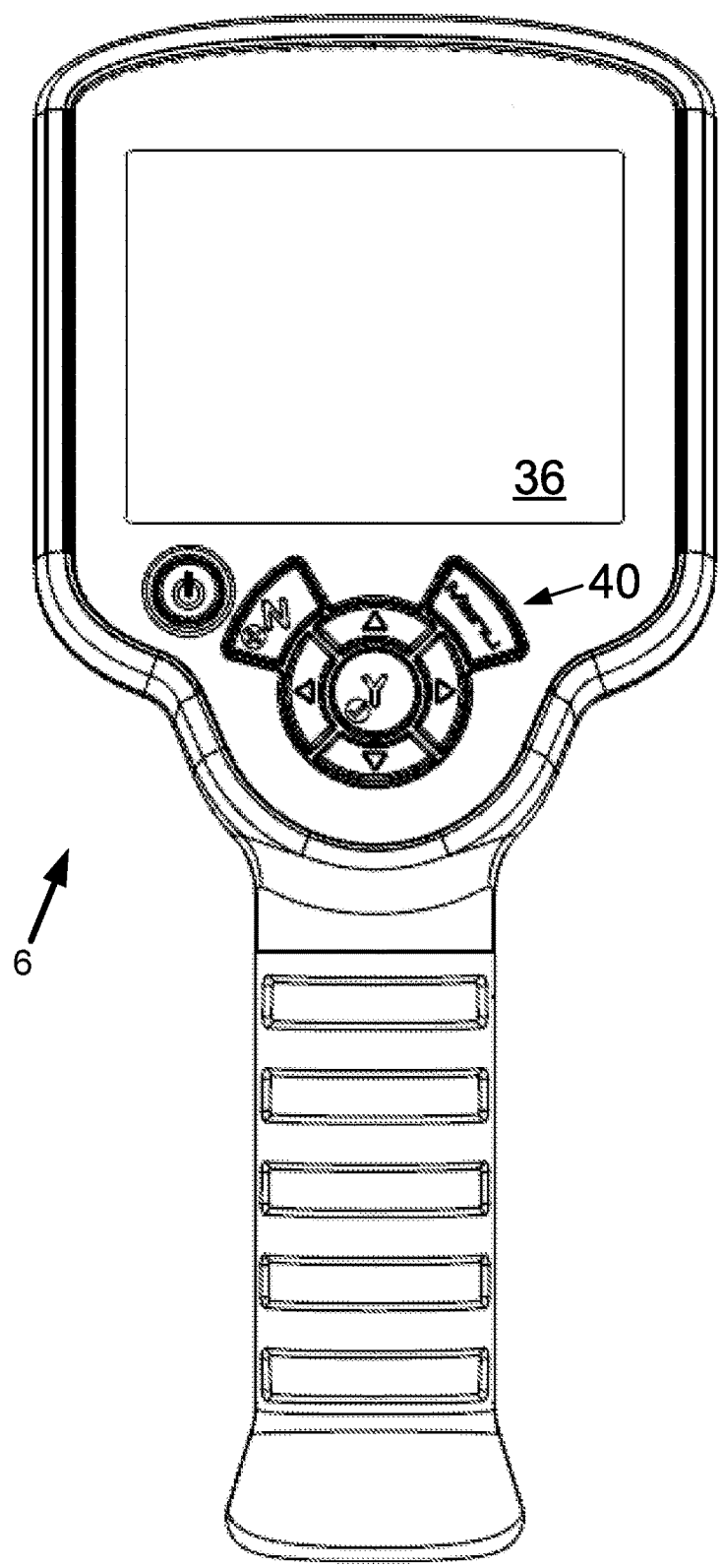
FIG. 2 is a rear view of an imaging device, according to an example embodiment.
Figure 3:
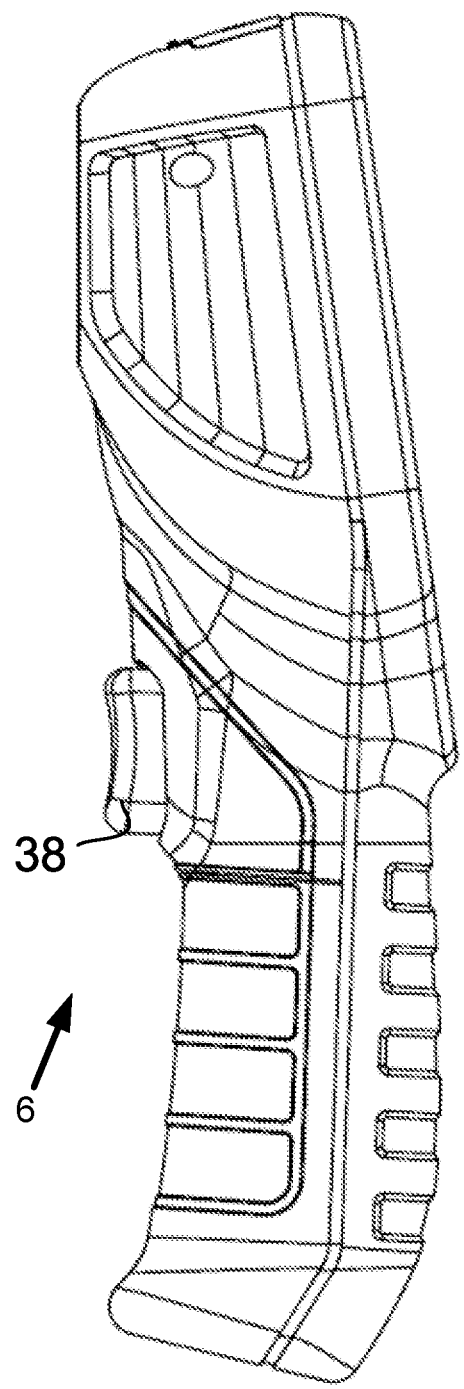
FIG. 3 is a side view of an imaging device, according to an example embodiment.
Figure 4:
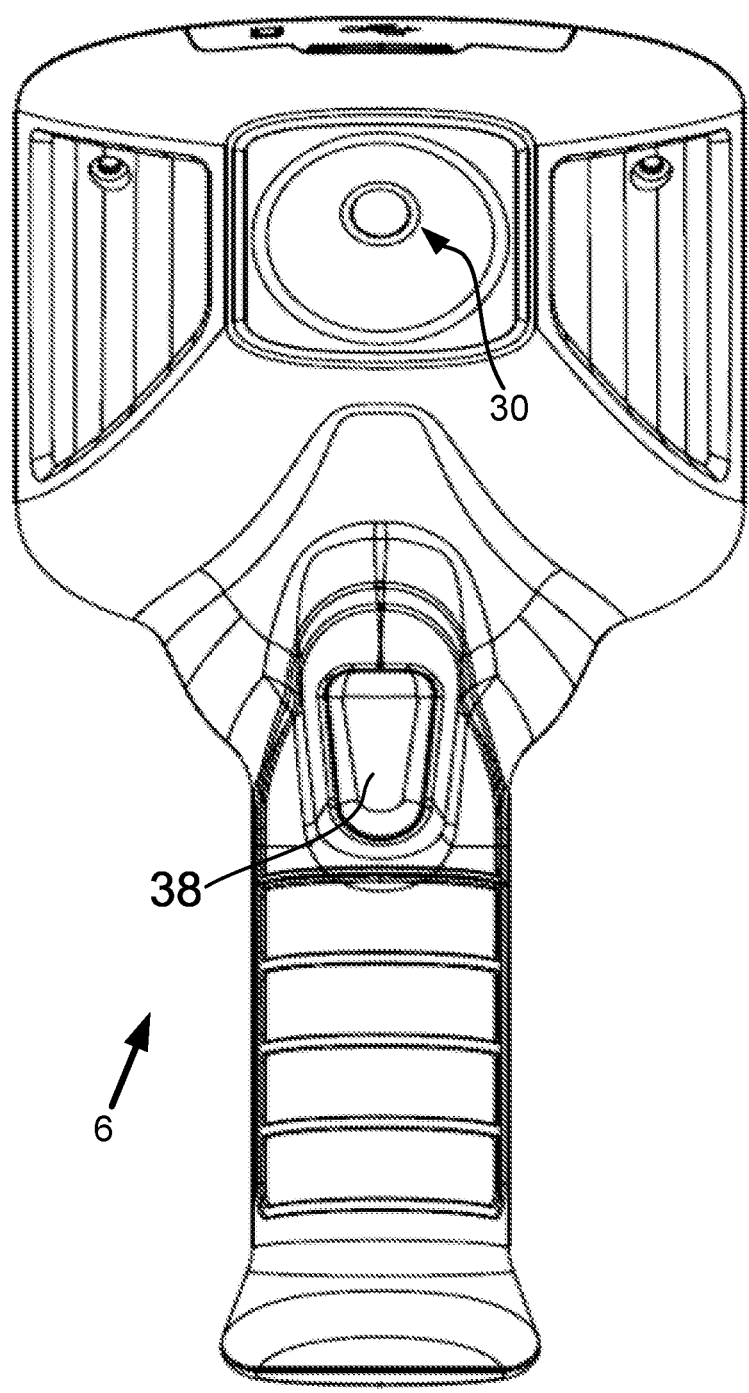
FIG. 4 is a front view of a thermal imaging device.

FIG. 2 depicts a rear view of an example implementation of the imaging device 6. FIG. 3 depicts a side view of the example implementation of the imaging device 6. FIG. 4 depicts a front view of the example implementation of the imaging device 6, showing an exterior portion of the camera 30.

FIGS. 5-10 depict operations performed by the imaging device 6.

Figure 5:
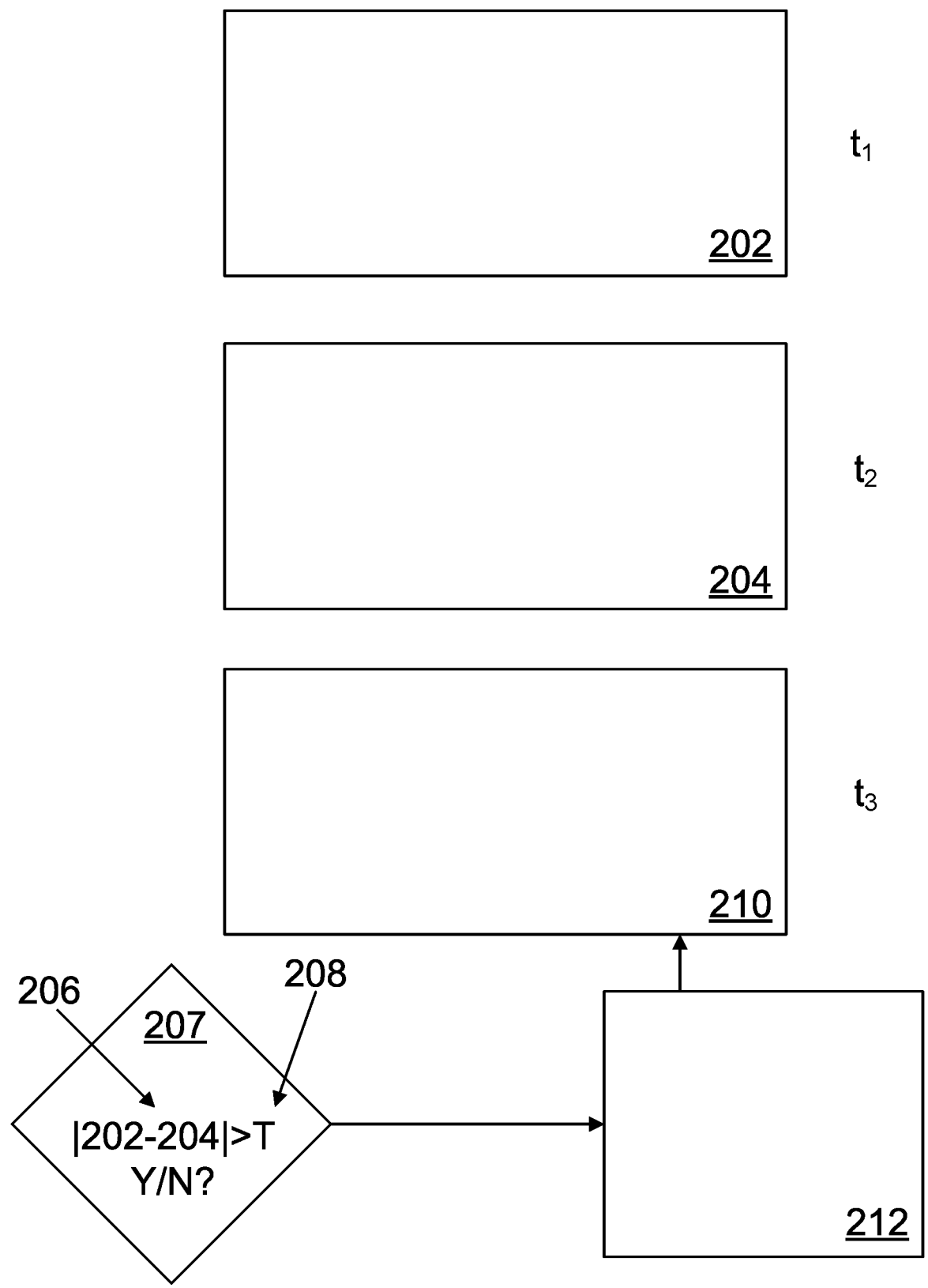
FIG. 5 is a schematic diagram of operations performed by an imaging device, according to an example embodiment.

As shown in FIG. 5, the imaging device 6 can capture a first image 202 (at time $t_1$) and thereafter capture a second image 204 (at time $t_2$). The first image 202 and the second image 204 (as well as any images described herein) can take the respective forms of a visual light image and/or a thermal (e.g., infrared) image. The imaging device 6 can capture the first image 202 and the second image 204 by using the camera 30. In some examples, the first image 202 and the second image 204 are visible light images and each pixel of the images represents intensity and/or wavelength of the visible light detected at the corresponding pixel location. In other examples, the first image 202 and the second image 204 are thermal images and each pixel of the images represents intensity of the infrared radiation detected at the corresponding pixel location. The intensity (e.g., temperature) and/or wavelength can be quantized on a 16-bit scale or a 32-bit scale, for example.

The imaging device 6 can then make a determination 207 of whether or not a difference 206 between the first image 202 and the second image 204 is greater than a threshold value 208. In some embodiments, the threshold value 208 can correspond to a pixel-to-pixel temperature difference ranging from 10 K to 15 K (e.g., 13 K). The threshold value 208 can be empirically determined but, in thermal image examples, will generally be quantified in units of temperature or intensity. As an example, the determination 207 can indicate the difference 206 is greater than the threshold value 208 or the difference is less than or equal to the threshold value 208. In FIG. 5, the difference 206 is depicted as an absolute (non-negative) difference, as indicated by the absolute value operator that surrounds the operand 202-204. Such a pair of vertical lines surrounding an operand can be interpreted as an absolute value operator throughout this application and the figures. Threshold values 208 and differences 206 can be stored at data 43 of the CRM 28.

Generally, the difference 206 is calculated by calculating a sum of absolute differences (SAD) between one or more pixel values of the first image 202 and one or more pixel values of the second image 204. The one or more pixel values of the first image 202 will generally have the same respective locations within the first image 202 as the respective locations of the one or more pixel values of the second image 204 within the second image 204. The pixel values can correspond to (e.g., partially or completely represent) intensity and/or wavelength of visible light, as defined by a particular color space such as Red/Green/Blue (RGB), YUV, HSL etc. The threshold value 208, however represented, can be thought of as a value that represents a substantial change in the captured scene between capture of the first image 202 and the second image 204 or a substantial change in the camera perspective between capture of the first image 202 and the second image 204.

As an example, the RGB color space uses the values (0, 0, 0) to represent the color black, and the values (255, 255, 255) to represent the color white. The numbers within those parentheses represent the following components of the RGB color space: (red component, green component, and blue component). As such, the aforementioned pixel values could be red components (e.g., R=100), green components (e.g., G=150), or blue components (e.g., B=200) of pixels of the first image 202 and/or the second image 204. The aforementioned pixel values could similarly be components of other visible light color spaces. In determining the difference 206, a red component can be compared to another red component, a green component can be compared to another green component, or a blue component can be compared to another blue component. As an alternative example, determining the difference 206 could include comparing a Y component to another Y component, a U component to another U component, or a V component to another V component. Other examples are possible.

Additionally or alternatively, a pixel value can represent a temperature indicated by an intensity of infrared radiation detected at the corresponding pixel location, or can represent the detected intensity of infrared radiation itself at the corresponding pixel location. Accordingly, the threshold value 208 can be a minimum difference in a corresponding intensity or temperature space (e.g., a minimum temperature difference of 10 K to 15 K).

The imaging device 6 can then generate a third image 210 by processing the second image 204 using an image processing algorithm 212 that corresponds to the determination 207. That is, the imaging device 6 can calculate a sum of absolute differences (SAD) (e.g., the difference 206) between one or more pixel values of the first image 202 and the corresponding one or more pixel values of the second image 204 and, based on how the SAD compares to the threshold, select the image processing algorithm that has been designated to correspond to the difference. The imaging device 6 can also compare the one or more pixels of the first image 202 and the one or more pixels of the second image 204 more generically and select an image processing algorithm based on the comparison. In some examples, there can be one or more first image processing algorithms that correspond to scenarios in which the difference 206 is greater than the threshold value T and one or more second image processing algorithms that correspond to scenarios in which the difference 206 is less than or equal to the threshold value T. In some scenarios, various temporal processing algorithms could be used having different time constants. The image processing algorithm 212 and any filters included therein can be stored at CRM 28.

Next, the imaging device 6 can use the display 36 to display the third image 210 as processed by the image processing algorithm 212. Prior to displaying the third image 210, the imaging device can perform a histogram equalization process and/or an automatic gain control process upon the third image 210. Prior to displaying the third image 210, the imaging device will also generally "colorize" the third image 210 by mapping temperatures or intensities represented by pixels of the third image 210 to particular colors that are to be displayed. A similar process can be repeated, as described below, to process and display a video stream that includes the first image 202, the third image 210, and one or more additional images.

Figure 6:
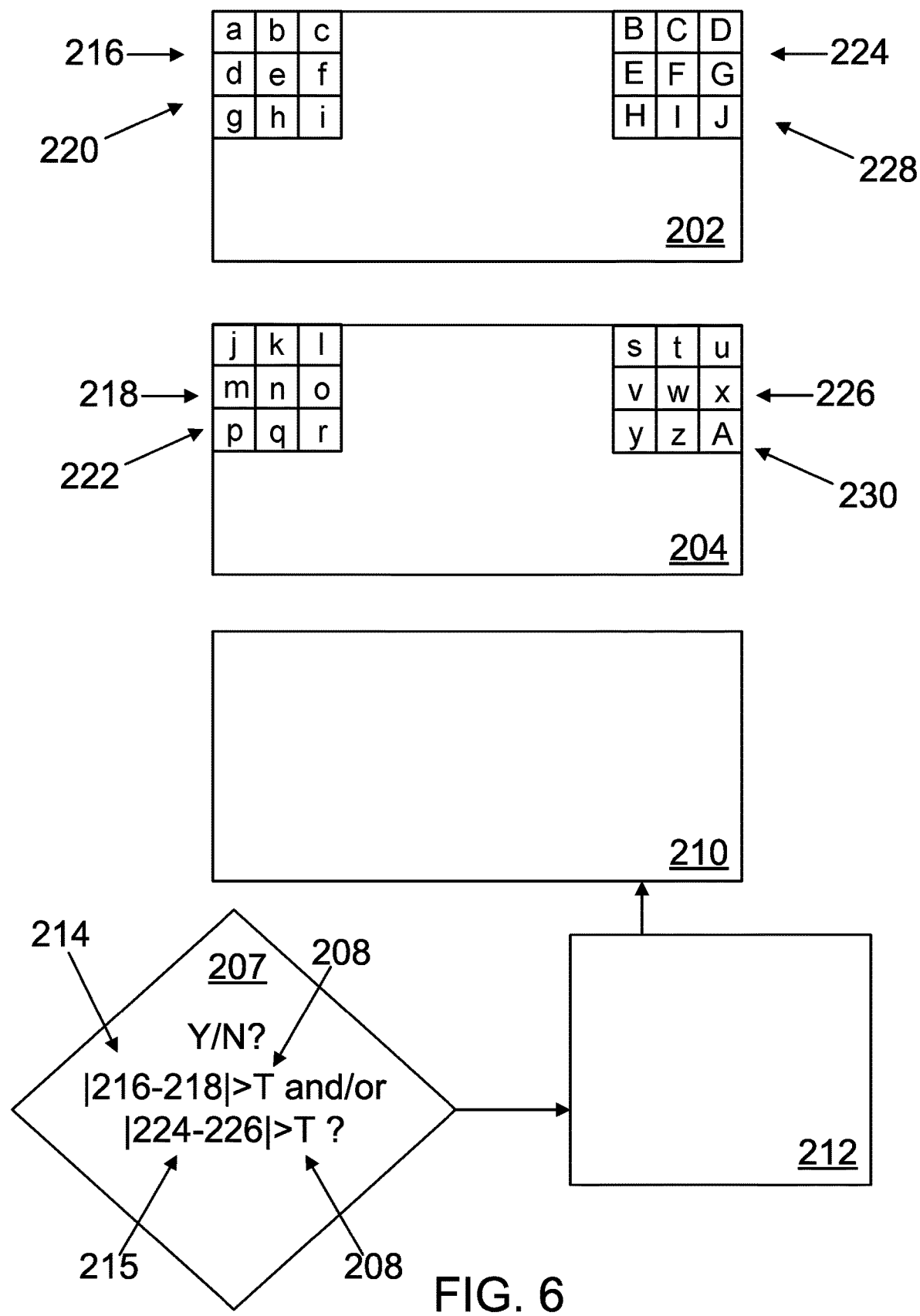
FIG. 6 is a schematic diagram of operations performed by an imaging device, according to an example embodiment.

FIG. 6 shows more details regarding how the imaging device 6 can calculate the difference 206. For the purpose of clarity, FIG. 6 shows some but not all pixels or pixel values that can be part of or associated with the first image 202 and the second image 204. Additionally, the depicted size of pixels with respect to the first image 202 and the second image 204 is generally not to scale. In FIG. 6, one or more first pixel values 216 are represented by the values a, b, c, d, e, f, g, h, and i. One or more second pixel values 218 are represented by the values j, k, l, m, n, o, p, q, and r. One or more third pixel values 224 are represented by the values B, C, D, E, F, G, H, I, and J. One or more fourth pixel values 226 are represented by the values s, t, u, v, w, x, y, z, and A.

In FIG. 6, the difference 206 takes the form of a first difference 214 and/or a second difference 215. As such, the imaging device 6 can calculate the first difference 214 between the one or more first pixel values 216 of the first image 202 and one or more second pixel values 218 of the second image 204. In this context, one or more first positions 220 of the one or more first pixel values 216 with respect to the first image 202 is equal to one or more second positions 222 of the one or more second pixel values 218 with respect to the second image 204. That is, the one or more first positions 220 and the one or more second positions 222 are both upper left corners of their respective images. As such, the imaging device 6 can determine the first difference 214 by calculating a sum of absolute differences, that is, $|a-j|+|b-k|+|c-l|+|d-m|+|e-n|+|f-o|+|g-p|+|h-q|+|i-r|$. The first difference 214 and the second difference 215 can be stored at data 43 of CRM 28.

Additionally, the imaging device 6 can calculate the second difference 215 between the one or more third pixel values 224 of the first image 202 and the one or more fourth pixel values 226 of the second image 204. In this context, one or more third positions 228 of the one or more third pixel values 224 with respect to the first image 202 is equal to one or more fourth positions 230 of the one or more fourth pixel values 226 with respect to the second image 204. Accordingly, the imaging device 6 can determine the difference 215 by calculating a sum of absolute differences, that is, $|B-s|+|C-t|+|D-u|+|E-v|+|F-w|+|G-x|+|H-y|+|I-z|+|J-A|$.

As such, making the determination 207 can include determining whether or not the first difference 214 and/or the second difference 215 is greater than the threshold value 208. In some examples, additional SADs between groups of pixels of the first image 202 and the second image 204 having corresponding locations within the images can be calculated for comparison to the threshold value 208.

For example, the imaging device can select an algorithm for processing the second image 204 based on whether or not the first difference 214 is greater than the threshold value 208. In such examples, the calculation of the single SAD can correspond to any group of pixel locations within the first image 202 and the second image 204. The one or more first positions 220 and the one or more second positions 222 are presented merely as examples.

In other examples, the imaging device also calculates the second difference 215. In such examples, the imaging device 6 can determine that the difference 206 is greater than the threshold value 208 if both the first difference 214 and the second difference 215 is greater than the threshold value 208. Alternatively, the imaging device 6 can determine that the difference 206 is greater than the threshold value 208 if either of the first difference 214 or the second difference 215 is greater than the threshold value 208.

In examples where three or more SADs of pixels of the first image 202 and the second image 204 are calculated, the imaging device 6 can determine that the difference 206 is greater than the threshold value 208 based on any number of the three or more SADs being greater than the threshold value 208.

Figure 7:
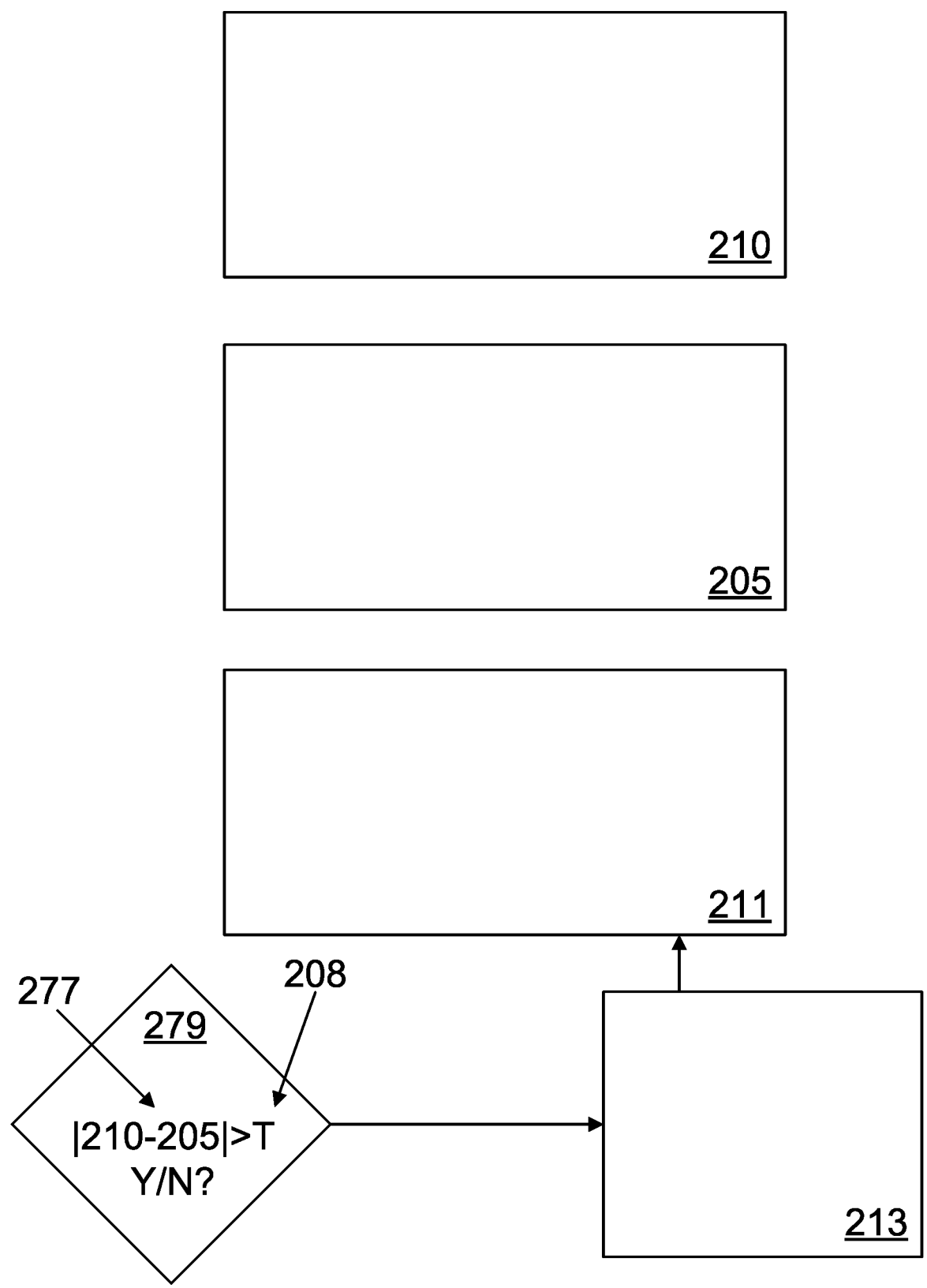
FIG. 7 is a schematic diagram of operations performed by an imaging device, according to an example embodiment.

FIG. 7 shows how the aforementioned processes can be repeated to process and display a video stream. As shown in FIG. 7, the imaging device 6 can capture a fourth image 205 and make a second determination 279 of whether or not a second difference 277 between the third image 210 and the fourth image 205 is greater than the threshold value 208. The imaging device 6 can then generate a fifth image 211 by processing the fourth image 205 using a second image processing algorithm 213 that corresponds to the second determination 279. In some examples, the second image processing algorithm 213 could be the same as the image processing algorithm 212. The imaging device 6 can then display the fifth image 211, for example, after displaying the third image 210. This process can be repeated to process and display a video stream that includes the first image 202, the third image 210, the fifth image 211, and one or more additional images. The second image processing algorithm 213 and any filters included therein can be stored at the CRM 28.

FIG. 8 shows operations of the imaging device 6 that are pertinent when (but not only when) the difference 206 is greater than the threshold value 208, that is, when the transition between the first image 202 and the second image 204 shows substantial motion. FIG. 8 shows the one or more second pixel values 218 of the second image 204. In this context, the imaging device 6 can compare a first pixel value 225 of the second image 204 to a second pixel value 217 of the second image 204. More generally, in scenarios where the difference between the first image 202 and the second image 204 is greater than the threshold value 208, the imaging device 6 can perform any image processing algorithm that includes comparing one pixel value of the second image 204 to another pixel value of the second image 204. For example, the imaging device 6 can use a median filter, a Gaussian filter, or any spatial (e.g., time-invariant) filter to process the second image 204.

In some examples, the spatial filter can be used on the second image 204 to generate the third image 210 without using any temporal filtering.

In other examples, the imaging device 6 can use a temporal filter on the first image 202 and the second image 204 and use a box blur filter (or another spatial filter) on the second image 204. For example, the imaging device 6 can determine an average of (i) a first pixel value 225 of the second image 204 and (ii) second pixel values 217, 219, 221, 223, 227, 229, 231, and 233 that surround the first pixel value 225 in the second image 204. That average can be the new (processed) pixel value of the third image 210 corresponding to the first pixel value 225. In calculating the average, the first pixel value 225 can be weighted more heavily than the second pixel values 217, 219, 221, 223, 227, 229, 231, and 233. Other examples are possible.

Figure 9:
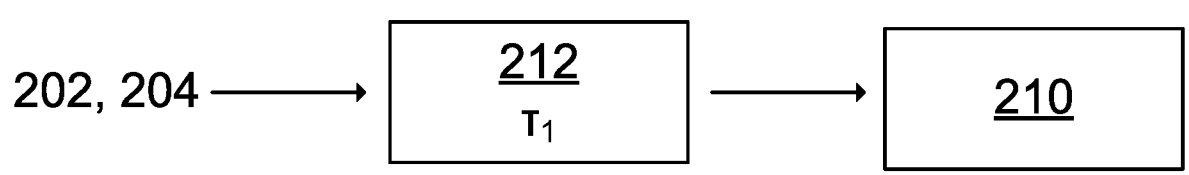
FIG. 9 is a schematic diagram of operations performed by an imaging device, according to an example embodiment.

FIG. 9 shows operations of the imaging device 6 that are pertinent when (but not only when) the difference 206 is less than or equal to the threshold value 208, that is, when the transition between the first image 202 and the second image 204 does not show substantial motion. For example, when the imaging device 6 makes the determination 207 that the difference 206 is less than or equal to the threshold value 208, the imaging device 6 can compare the second image 204 to the first image 202 as part of the image processing algorithm 212 (e.g., a temporal image processing algorithm) that is used to generate the third image 210. For example, the imaging device 6 can use an impulse response filter, a moving average filter, or any other temporal processing filter upon the first image and the second image, with or without using a spatial filter. As shown in FIG. 9, the image processing algorithm 212 has a time constant $T_1$.

Figure 10:
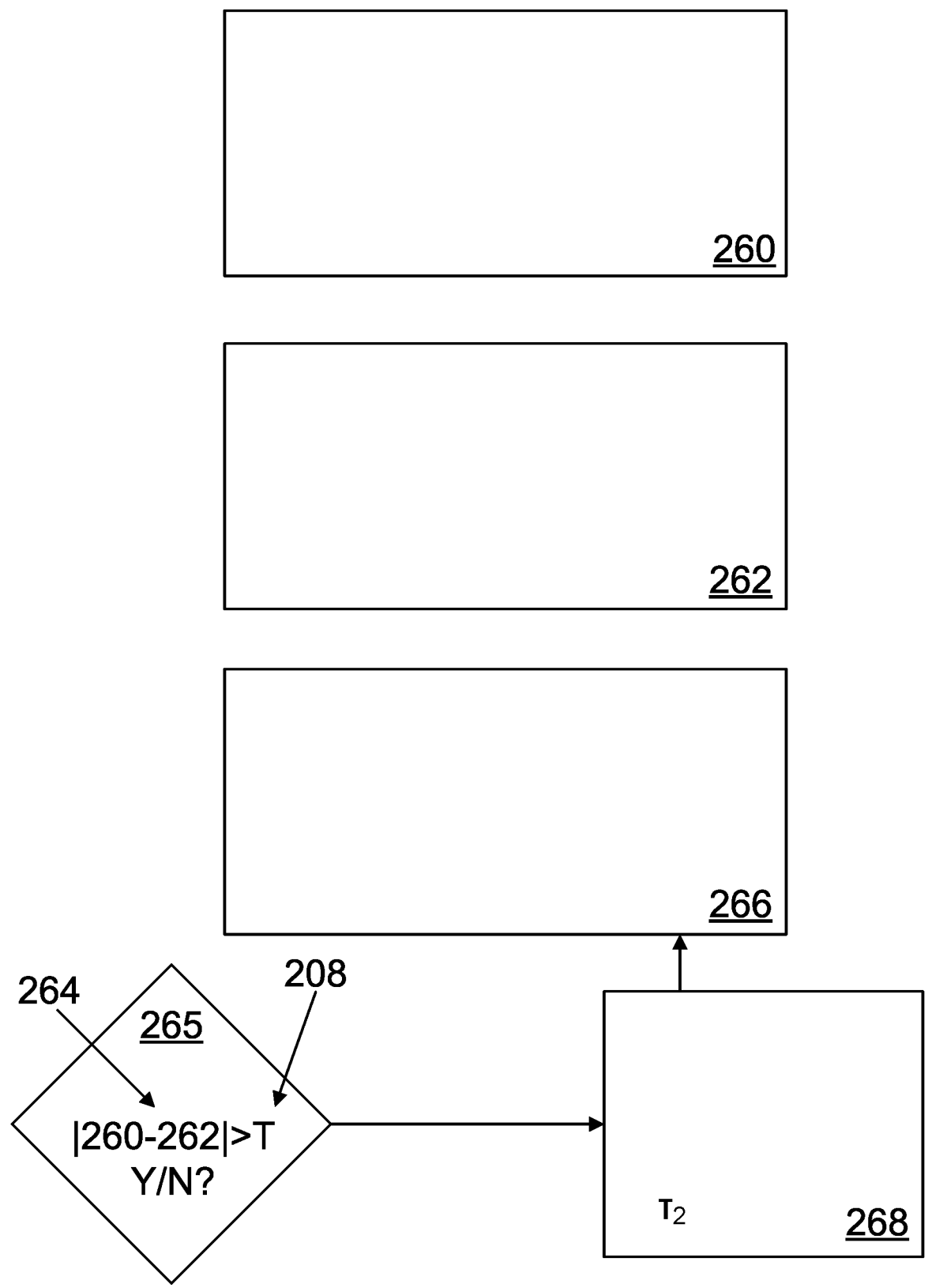
FIG. 10 is a schematic diagram of operations performed by an imaging device, according to an example embodiment.

FIG. 10 shows further operations of the imaging device 6 that can follow those depicted in FIG. 9. The imaging device 6 can capture a fourth image 260 and thereafter a fifth image 262 and make a second determination 265 that a second difference 264 between the fourth image 260 and the fifth image 262 is greater than the threshold value 208. The imaging device 6 can also generate a sixth image 266 by processing the fifth image 262 and the fourth image 260 using a second temporal filter 268 having a second time constant $T_2$ that is less than the first time constant $T_1$. The imaging device 6 can also display the sixth image 266.

Figure 11:
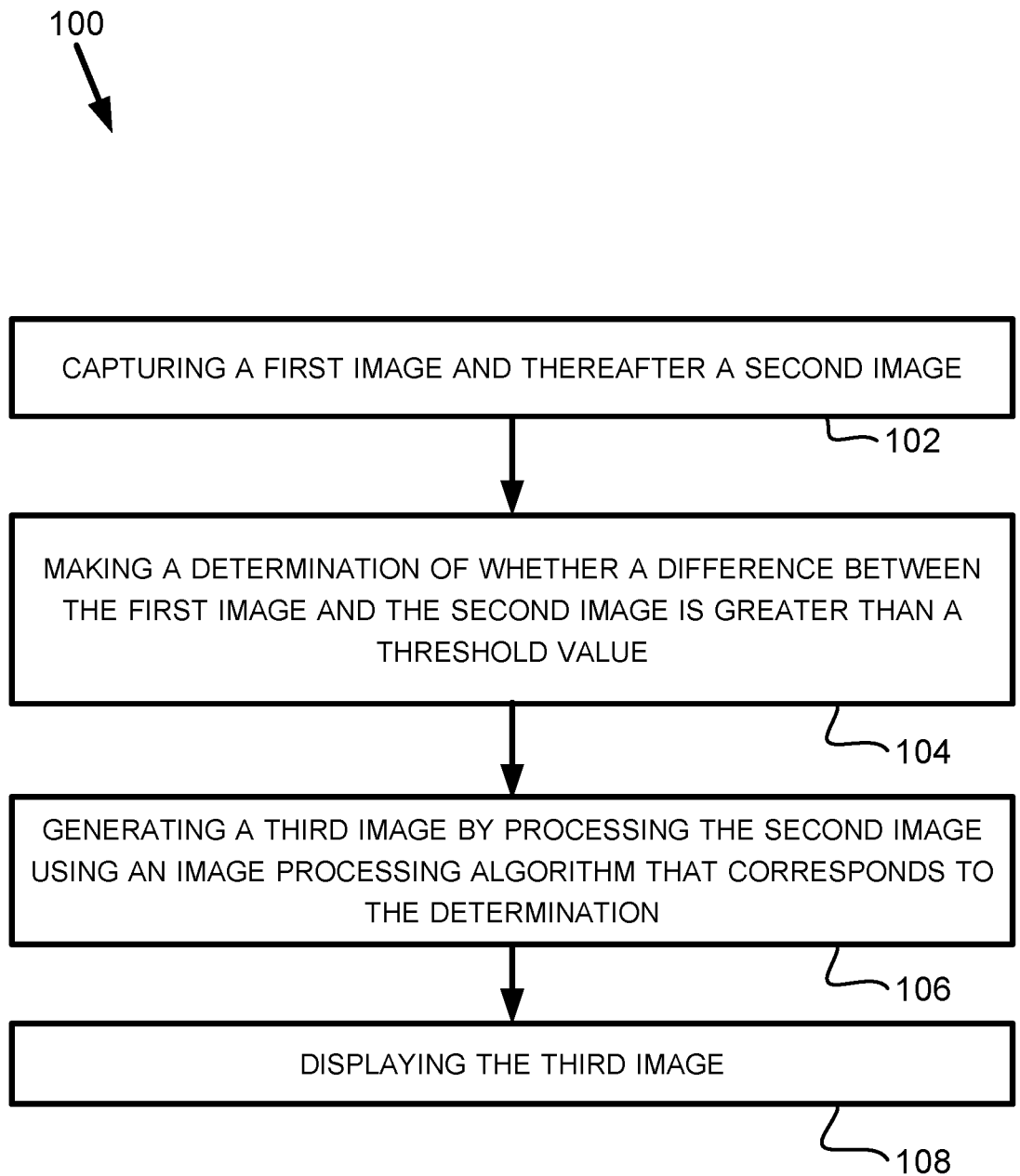
FIG. 11 is a block diagram of a method, according to an example embodiment.

FIG. 11 shows a flowchart of the method 100 for operating the imaging device 6, according to example implementations. As shown in FIG. 11, the method 100 includes one or more operations, functions, or actions as illustrated by blocks 102, 104, 106, and 108. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Referring to FIG. 11, block 102 of the method 100 includes capturing the first image 202 and thereafter the second image 204.

Block 104 of the method 100 includes making the determination 207 of whether or not the difference 206 between the first image 202 and the second image 204 is greater than the threshold value 208.

Block 106 of the method 100 includes generating the third image 210 by processing the second image 204 using the image processing algorithm 212 that corresponds to the determination 207.

Block 108 of the method 100 includes displaying the third image 210.

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a non-transitory computer-readable medium storing program instructions, that when executed by a processor of a machine cause a set of functions to be performed, the set of functions comprising the features or functions of the aspects and embodiments described herein.

Examples of the present disclosure can thus relate to one of the enumerated clauses (EC) listed below.

EC 1 is an imaging device comprising: one or more processors; and a computer readable medium storing instructions that, when executed by the one or more processors, cause the imaging device to perform functions comprising: capturing a first image and thereafter a second image; making a determination of whether or not a difference between the first image and the second image is greater than a threshold value; generating a third image by processing the second image using an image processing algorithm that corresponds to the determination; and displaying the third image.

EC 2 is the imaging device of EC 1, wherein making the determination comprises: calculating a first difference between one or more first pixel values of the first image and one or more second pixel values of the second image, wherein one or more first positions of the one or more first pixel values with respect to the first image is equal to one or more second positions of the one or more second pixel values with respect to the second image.

EC 3 is the imaging device of EC 2, the functions further comprising: calculating a second difference between one or more third pixel values of the first image and one or more fourth pixel values of the second image, wherein one or more third positions of the one or more third pixel values with respect to the first image is equal to one or more fourth positions of the one or more fourth pixel values with respect to the second image, wherein making the determination further comprises determining whether or not the first difference and/or the second difference is greater than the threshold value.

EC 4 is the imaging device of any one of ECs 1-3, wherein making the determination comprises determining that the difference is greater than the threshold value, and wherein using the image processing algorithm comprises comparing a first pixel value of the second image to a second pixel value of the second image.

EC 5 is the imaging device of EC 4, wherein using the image processing algorithm comprises using a median filter on the second image.

EC 6 is the imaging device of any one of ECs 4-5, wherein using the image processing algorithm comprises using a Gaussian filter on the second image.

EC 7 is the imaging device of any one of ECs 4-6, wherein using the image processing algorithm comprises using a spatial filter on the second image without using a temporal filter.

EC 8 is the imaging device of any one of ECs 1-3, wherein making the determination comprises determining that the difference is less than or equal to the threshold value, and wherein using the image processing algorithm comprises comparing the second image to the first image.

EC 9 is the imaging device of EC 8, wherein using the image processing algorithm comprises applying an impulse response filter to the first image and the second image.

EC 10 is the imaging device of any one of ECs 8-9, wherein using the image processing algorithm comprises applying a moving average filter to the first image and the second image.

EC 11 is the imaging device of any one of ECs 8-10, wherein using the image processing algorithm comprises using a temporal filter on the first image and the second image and using a box blur filter on the second image.

EC 12 is the imaging device of EC 11, wherein using the box blur filter comprises determining an average of (i) a first pixel value of the second image and (ii) second pixel values that surround the first pixel value in the second image.

EC 13 is the imaging device of EC 12, wherein the first pixel value is weighted heavier than the second pixel values in determining the average.

EC 14 is the imaging device of any one of ECs 8-13, wherein using the image processing algorithm comprises using a temporal filter on the first image and the second image without using a spatial filter.

EC 15 is the imaging device of any one of ECs 1-3 and 8-14, wherein making the determination comprises determining that the difference is less than or equal to the threshold value, and wherein using the image processing algorithm comprises using a first temporal filter having a first time constant on the first image and the second image, the functions further comprising: capturing a fourth image and thereafter a fifth image; making a second determination that a second difference between the fourth image and the fifth image is greater than the threshold value; generating a sixth image by processing the fifth image and the fourth image using a second temporal filter having a second time constant that is less than the first time constant; and displaying the sixth image.

EC 16 is the imaging device of any one of ECs 1-15, wherein processing the second image using the image processing algorithm that corresponds to the determination comprises processing the second image using a histogram equalization process.

EC 17 is the imaging device of any one of ECs 1-16, the functions further comprising: capturing a fourth image; making a second determination of whether or not a second difference between the third image and the fourth image is greater than the threshold value; generating a fifth image by processing the fourth image using a second image processing algorithm that corresponds to the second determination; and displaying the fifth image.

EC 18 is the imaging device of any one of ECs 1-17, wherein the third image comprises thermal image data and visual light data.

EC 19 is a method comprising: capturing a first image and thereafter a second image; making a determination of whether or not a difference between the first image and the second image is greater than a threshold value; generating a third image by processing the second image using an image processing algorithm that corresponds to the determination; and displaying the third image.

EC 20 is the method of EC 19, wherein the third image comprises thermal image data and visual light data.

EC 21 is the method of any one of ECs 19-20, wherein making the determination comprises: calculating a first difference between one or more first pixel values of the first image and one or more second pixel values of the second image, wherein one or more first positions of the one or more first pixel values with respect to the first image is equal to one or more second positions of the one or more second pixel values with respect to the second image.

EC 22 is the method of EC 21, further comprising calculating a second difference between one or more third pixel values of the first image and one or more fourth pixel values of the second image, wherein one or more third positions of the one or more third pixel values with respect to the first image is equal to one or more fourth positions of the one or more fourth pixel values with respect to the second image, wherein making the determination further comprises determining whether or not the first difference and/or the second difference is greater than the threshold value.

EC 23 is the method of any one of ECs 19-22, wherein making the determination comprises determining that the difference is greater than the threshold value, and wherein using the image processing algorithm comprises comparing a first pixel value of the second image to a second pixel value of the second image.

EC 24 is the method of EC 23, wherein using the image processing algorithm comprises using a median filter on the second image.

EC 25 is the method of any one of ECs 23-24, wherein using the image processing algorithm comprises using a Gaussian filter on the second image.

EC 26 is the method of any one of ECs 23-25, wherein using the image processing algorithm comprises using a spatial filter on the second image without using a temporal filter.

EC 27 is the method of any one of ECs 19-22, wherein making the determination comprises determining that the difference is less than or equal to the threshold value, and wherein using the image processing algorithm comprises comparing the second image to the first image.

EC 28 is the method of EC 27, wherein using the image processing algorithm comprises applying an impulse response filter to the first image and the second image.

EC 29 is the method of any one of ECs 27-28, wherein using the image processing algorithm comprises applying a moving average filter to the first image and the second image.

EC 30 is the method of any one of ECs 27-29, wherein using the image processing algorithm comprises using a temporal filter on the first image and the second image and using a box blur filter on the second image.

EC 31 is the method of EC 30, wherein using the box blur filter comprises determining an average of (i) a first pixel value of the second image and (ii) second pixel values that surround the first pixel value in the second image.

EC 32 is the method of EC 31, wherein the first pixel value is weighted heavier than the second pixel values in determining the average.

EC 33 is the method of any one of ECs 27-32, wherein using the image processing algorithm comprises using a temporal filter on the first image and the second image without using a spatial filter.

EC 34 is the method of any one of ECs 19-22 and 27-33, wherein making the determination comprises determining that the difference is less than or equal to the threshold value, and wherein using the image processing algorithm comprises using a first temporal filter having a first time constant on the first image and the second image, the method further comprising: capturing a fourth image and thereafter a fifth image; making a second determination that a second difference between the fourth image and the fifth image is greater than the threshold value; generating a sixth image by processing the fifth image and the fourth image using a second temporal filter having a second time constant that is less than the first time constant; and displaying the sixth image.

EC 35 is the method of any one of ECs 19-34, wherein processing the second image using the image processing algorithm that corresponds to the determination comprises processing the second image using a histogram equalization process.

EC 36 is the method of any one of ECs 19-35, further comprising: capturing a fourth image; making a second determination of whether or not a second difference between the third image and the fourth image is greater than the threshold value; generating a fifth image by processing the fourth image using a second image processing algorithm that corresponds to the second determination; and displaying the fifth image.

EC 37 is a non-transitory computer readable medium storing instructions that, when executed by an imaging device, cause the imaging device to perform functions comprising: capturing a first image and thereafter a second image; making a determination of whether or not a difference between the first image and the second image is greater than a threshold value; generating a third image by processing the second image using an image processing algorithm that corresponds to the determination; and displaying the third image.

EC 38 is a non-transitory computer readable medium storing instructions that, when executed by an imaging device, cause the imaging device to perform the method of any one of ECs 20-36.

What is claimed is:

1. An imaging device comprising:
   one or more processors; and
   a computer readable medium storing instructions that, when executed by the one or more processors, cause the imaging device to perform functions comprising:
   capturing a first image and thereafter a second image;
   processing the second image using a spatial filter to generate a third image in response to determining that a first difference between the first image and the second image is greater than a threshold value; or
   processing the first image and the second image using a temporal filter to generate the third image in response to determining that a second difference between the first image and the second image is less than the threshold value; and
   displaying the third image.

2. The imaging device of claim 1, wherein determining that the first difference between the first image and the second image is greater than the threshold value and determining that the second difference between the first image and the second image is less than the threshold value each comprises:
   calculating a third difference between one or more first pixel values of the first image and one or more second pixel values of the second image, wherein one or more first positions of the one or more first pixel values with respect to the first image is equal to one or more second positions of the one or more second pixel values with respect to the second image.

3. The imaging device of claim 2, the functions further comprising:
   calculating a fourth difference between one or more third pixel values of the first image and one or more fourth pixel values of the second image, wherein one or more third positions of the one or more third pixel values with respect to the first image is equal to one or more fourth positions of the one or more fourth pixel values with respect to the second image,
   wherein determining that the first difference between the first image and the second image is greater than the threshold value and determining that the second difference between the first image and the second image is less than the threshold value each comprises determining whether the third difference is greater than the threshold value and whether the fourth difference is greater than the threshold value.

4. The imaging device of claim 1, wherein the spatial filter includes a median filter.

5. The imaging device of claim 1, wherein the spatial filter includes a Gaussian filter.

6. The imaging device of claim 1, wherein processing the second image using the spatial filter comprises processing the second image without using the temporal filter.

7. The imaging device of claim 1, wherein the temporal filter includes an impulse response filter.

8. The imaging device of claim 1, wherein the temporal filter includes a moving average filter.

9. The imaging device of claim 1, the functions comprising:
   processing the first image and the second image using the temporal filter to generate the third image in response to determining that the second difference between the first image and the second image is less than the threshold value; and
   using a box blur filter on the second image.

10. The imaging device of claim 9, wherein using the box blur filter comprises determining an average of (i) a first pixel value of the second image and (ii) second pixel values that surround the first pixel value in the second image.

11. The imaging device of claim 10, wherein the first pixel value is weighted heavier than the second pixel values in determining the average.

12. The imaging device of claim 1, wherein processing the first image and the second image using the temporal filter comprises processing the first image and the second image without using the spatial filter.

13. The imaging device of claim 1, the functions comprising:
processing the first image and the second image using the temporal filter to generate the third image, the temporal filter having a first time constant;
capturing a fourth image and thereafter a fifth image;
making a determination that a third difference between the fourth image and the fifth image is greater than the threshold value;
generating a sixth image by processing the fourth image and the fifth image using a second temporal filter having a second time constant that is less than the first time constant; and
displaying the sixth image.

14. The imaging device of claim 1, the functions further comprising processing the second image using a histogram equalization process to generate the third image.

15. The imaging device of claim 1, the functions further comprising:
capturing a fourth image;
making a determination of whether a third difference between the third image and the fourth image is greater than the threshold value;
generating a fifth image by processing the fourth image using a second image processing algorithm that corresponds to the determination; and
displaying the fifth image.

16. The imaging device of claim 1, wherein the third image comprises thermal image data and visual light data.

17. The imaging device of claim 1, the functions comprising:
processing the second image using the spatial filter to generate the third image in response to determining that the first difference between the first image and the second image is greater than the threshold value, wherein the first difference corresponds to first pixels at a first position within the first image and second pixels at the first position within the second image; and
processing the first image and the second image using the temporal filter to generate the third image in response to determining that the second difference between the first image and the second image is less than the threshold value, wherein the second difference corresponds to third pixels at a second position within the first image and fourth pixels at the second position within the second image.

18. A method comprising:
capturing a first image and thereafter a second image;
processing the second image using a spatial filter to generate a third image in response to determining that a first difference between the first image and the second image is greater than a threshold value; or
processing the first image and the second image using a temporal filter to generate the third image in response to determining that a second difference between the first image and the second image is less than the threshold value; and
displaying the third image.

19. The method of claim 18, comprising:
processing the second image using the spatial filter to generate the third image in response to determining that the first difference between the first image and the second image is greater than the threshold value, wherein the first difference corresponds to first pixels at a first position within the first image and second pixels at the first position within the second image; and
processing the first image and the second image using the temporal filter to generate the third image in response to determining that the second difference between the first image and the second image is less than the threshold value, wherein the second difference corresponds to third pixels at a second position within the first image and fourth pixels at the second position within the second image.

20. A non-transitory computer readable medium storing instructions that, when executed by an imaging device, cause the imaging device to perform functions comprising:
capturing a first image and thereafter a second image;
processing the second image using a spatial filter to generate a third image in response to determining that a first difference between the first image and the second image is greater than a threshold value; or
processing the first image and the second image using a temporal filter to generate the third image in response to determining that a second difference between the first image and the second image is less than the threshold value; and
displaying the third image.

* * * * *